United States Patent [19]
Forchheimer et al.

[11] Patent Number: 5,822,468
[45] Date of Patent: Oct. 13, 1998

[54] METHOD OF CARRYING OUT PICTURE PROCESSING OPERATIONS UPON A TWO-DIMENSIONAL PICTURE AND A DEVICE FOR CARRYING OUT SAID METHOD

[75] Inventors: Robert Forchheimer; Anders Astrom, both of Linkoping, Sweden

[73] Assignee: IVP Integrated Vision Products AB, Linkoping, Sweden

[21] Appl. No.: 878,454

[22] Filed: Jun. 18, 1997

Related U.S. Application Data

[63] Continuation of Ser. No. 303,833, Sep. 9, 1994, abandoned.

[30] Foreign Application Priority Data

Mar. 10, 1992 [SE] Sweden ................. 9200726

[51] Int. Cl.$^6$ ........................................ G06K 9/20
[52] U.S. Cl. ............................. 382/321; 382/275
[58] Field of Search ................... 382/321, 270, 382/275, 323; 348/212, 234

[56] References Cited

U.S. PATENT DOCUMENTS

| | | | |
|---|---|---|---|
| 3,872,434 | 3/1975 | Duvall et al. | 340/146 |
| 4,233,632 | 11/1980 | Akiyama | 358/212 |
| 4,491,962 | 1/1985 | Sakou et al. | 382/50 |
| 4,589,034 | 5/1986 | Yokomizo | 358/234 |
| 4,684,991 | 8/1987 | Forchheimer et al. | 358/213.11 |
| 4,748,677 | 5/1988 | Yokomizo | 382/50 |
| 4,905,090 | 2/1990 | Singh et al. | 382/50 |
| 4,959,869 | 9/1990 | Hongo | 382/51 |
| 5,297,222 | 3/1994 | Mori et al. | 382/62 |

OTHER PUBLICATIONS

International Search Report for PCT/SE93/00182, dated 14 Jun. 1993.

*Primary Examiner*—Joseph Mancuso
*Attorney, Agent, or Firm*—Merchant, Gould, Smith, Edell, Welter & Schmidt, P.A.

[57] ABSTRACT

The invention relates to a method of executing image processing operations such as object recognition or linear/non-linear filtration on a two-dimensional image. This is performed with light-sensitive sensor elements (4) executed in two-dimensional matrix form. The sensor elements (4) are so arranged as to produce an output signal corresponding to the light intensity. The output signal of each sensor element is compared with a monotone increasing or reducing reference value. The extent to which the output signal from the sensor element is greater than or less than the reference value is continuously monitored for each sensor element. An arrangement for the execution of this method comprises a number of sensor elements (4) arranged on a substrate. Each of these has allocated to it on the substrate a comparator (5) so arranged as to compare the output signal of the sensor element with a pre-adjustable reference value and a sub-processor. Each sub-processor (8) is so arranged as to identify the occurrence of combinations of sensor elements (4) for which the output signal has exceeded or has not exceeded the aforementioned reference value.

24 Claims, 6 Drawing Sheets

| No. | b1 | b2 | b3 | b4 | Direction |
|-----|----|----|----|----|-----------|
| 0   | 0  | 0  | 0  | 0  | None |
| 1   | 0  | 0  | 0  | 1  | West |
| 2   | 0  | 0  | 1  | 0  | East |
| 3   | 0  | 0  | 1  | 1  | East-West |
| 4   | 0  | 1  | 0  | 0  | South |
| 5   | 0  | 1  | 0  | 1  | South-West |
| 6   | 0  | 1  | 1  | 0  | South-East |
| 7   | 0  | 1  | 1  | 1  | Not North |
| 8   | 1  | 0  | 0  | 0  | North |
| 9   | 1  | 0  | 0  | 1  | North-West |
| 10  | 1  | 0  | 1  | 0  | Not East |
| 11  | 1  | 0  | 1  | 1  | Not South |
| 12  | 1  | 1  | 0  | 0  | North-South |
| 13  | 1  | 1  | 0  | 1  | Not East |
| 14  | 1  | 1  | 1  | 0  | Not West |
| 15  | 1  | 1  | 1  | 1  | All |

| 1 | -2 | 1 |

(a)

(b)

(c)

(d)

0   0   1   1   -1   -1   -1   0   0   0     (e)

0   0   1   2   1   0   -1   -1   -1   -1    (f)

METHOD OF CARRYING OUT PICTURE PROCESSING OPERATIONS UPON A TWO-DIMENSIONAL PICTURE AND A DEVICE FOR CARRYING OUT SAID METHOD

This is a Continuation of application Ser. No. 08/303,833, filed Sep. 9, 1994, now abandoned.

The present invention relates to a method of executing image processing operations such as object recognition or linear/non-linear filtration on a two-dimensional image, which is performed with light-sensitive sensor elements executed in two-dimensional matrix form and so arranged as to produce an output signal corresponding to the light intensity. In accordance with an alternative method, the sensor elements are of the light-integrating type, i.e. the output signal of each sensor element corresponds to its state of charge.

The invention also relates to an arrangement for the execution of an image processing operation such as object recognition or linear/non-linear filtration on a two-dimensional image comprising a number of sensor elements arranged on a substrate, in association with each of which there is allocated on the substrate a comparator so arranged as to compare the output signal of the sensor element with a pre-adjustable reference value and a sub-processor.

The area of "computerized image analysis" began to be developed in the 1960s, at a time when it became technically possible to use a computer to process the image signal from a TV camera. Two fundamental problems had to be overcome. One of these was to make the computer rapid enough to be able to cope with the broad-band image signal, and the other was to have access to a sufficient amount of memory to be able to store the large quantities of data produced by the images.

The first limitation was very difficult to overcome. The development work was accordingly to be concentrated on still images, linked with which was a residual requirement to be able to store the image in the working memory of the computer, satisfactory solutions to which were found in the early 1970s through the development of memory techniques.

The system solution arrived at in this way using a TV camera, the signal from which is converted in an analogue/digital (A/D) manner and is stored in an image memory for processing in the computer, has had such a marked effect on the area of image processing that it is still practically the sole system concept, even today. The concept is also underpinned by the fact that even today's computers are too slow to be able to process moving images at the rate at which they are delivered from the camera.

Previously disclosed via U.S. Pat. No. 4,684,991 is an arrangement for an array of photo-diodes arranged in matrix form. These are connected to an image processing processor of the kind which permits parallel signal processing and which is integrated on the same semi-conductor slice as the photo-diodes. Also integrated on the same semi-conductor slice and connected to the processor slice is a digital network of a combinative or sequential kind so arranged as to produce a numerical and/or positional determination of the image element, which has been found to satisfy a digital condition via the photo-diodes and the image processing processor.

The previously disclosed arrangement permits the execution of operations such as surface area and centre of mass calculations, but is not applicable to the execution of general image processing operations such as median filtration, for example.

One object of the present invention is to provide a method of the kind referred to by way of introduction, which permits increased opportunities to perform a wider range of usable image processing operations. This is achieved in accordance with the invention in that the output signal of each sensor element is compared with a monotone increasing or reducing reference value, and in that the extent to which the output signal from the sensor element is greater than or less than the reference value is continuously monitored for each sensor element. An alternative method, which calls for sensor elements of the light-integrating type, is characterized in that the output signal from each sensor element is compared with a pre-adjustable reference value, and in that the extent to which the output signal from the sensor element meets or does not meet the reference value is continuously monitored for each sensor element.

In accordance with one particular characteristic of the invention, the aforementioned reference value is allowed to vary so that a predetermined relationship, for example a linearization, is achieved between the light intensity and the time at which the output signal of the sensor element reached the reference value.

In accordance with a second particular characteristic of the invention, a group of sensor elements in the matrix is sorted in a series corresponding to the sequence in which the output signals from the sensor element pass the aforementioned reference value, which involves median filtration.

In accordance with a further particular characteristic of the invention, the method in accordance with the invention is applied in such a way that the sensor element whose output signal first passes the reference value is identified, which involves detecting the lightest point in the image.

A further development of the method in accordance with the invention involves establishing, for a group of sensor elements in the matrix, the extent to which the output signal has reached the reference value in a predetermined combination of sensor elements, whilst other sensor elements in the group have not done so, which is synonymous with a morphological operation.

An additional further development has been achieved through the accumulation for each sensor element of pulses, the number of which, when the output signal reaches the reference value, is a digital value for the light intensity.

By generating the aforementioned pulses with a variable frequency in this way, a pre-determined relationship, for example a linearization, is achieved between the light intensity and its corresponding digital value.

If, in a group of sensor elements in the matrix, a filter coefficient is allocated to each element in the group, and if associated filter coefficients are successively accumulated for each sensor element in which the output signal has reached the reference value, this is synonymous with a linear filtration.

A pre-determined relationship is achieved in this way, for example a linearization, between the light intensity and the point in time at which the output signal from the sensor element has reached the reference value if the successive accumulation takes place at an appropriately selected variable frequency.

An A/D conversion of the image is achieved by including in the calculation pulses in a digital result directory for each sensor element at a pre-determined frequency during the exposure period.

An arrangement by means of which the method in accordance with the invention can be executed is characterized in that each sub-processor is so arranged as to identify the occurrence of combinations of sensor elements for which the output signal has exceeded or has not exceeded the aforementioned reference value.

In accordance with a further development of the arrangement in accordance with the invention, the sub-processor includes an accumulator directory so arranged either as to count pulses, the number of which, at the time when the output signal reaches the reference value, is an indicator of the light intensity, or as to successively accumulate coefficients associated with an image processing operation during its execution. A controllable propagation network is preferably also arranged on the same substrate as the sensor elements and the sub-processors.

The invention is described below in greater detail with reference to the accompanying drawings, in which.

Figure 1:
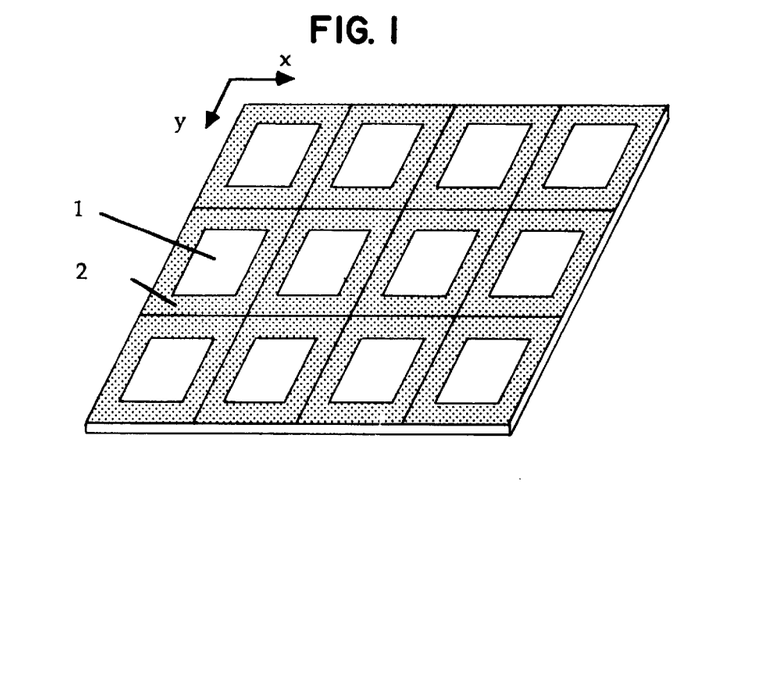
FIG. 1 illustrates schematically an arrangement in accordance with the invention.

The designation 1 is used in FIG. 1 for a sensor element in a matrix with a total of twelve sensor elements arranged on a substrate. A comparator and a sub-processor, both designated by 2, are allocated to each of the sensor elements 1 on the substrate.

Figure 2A:
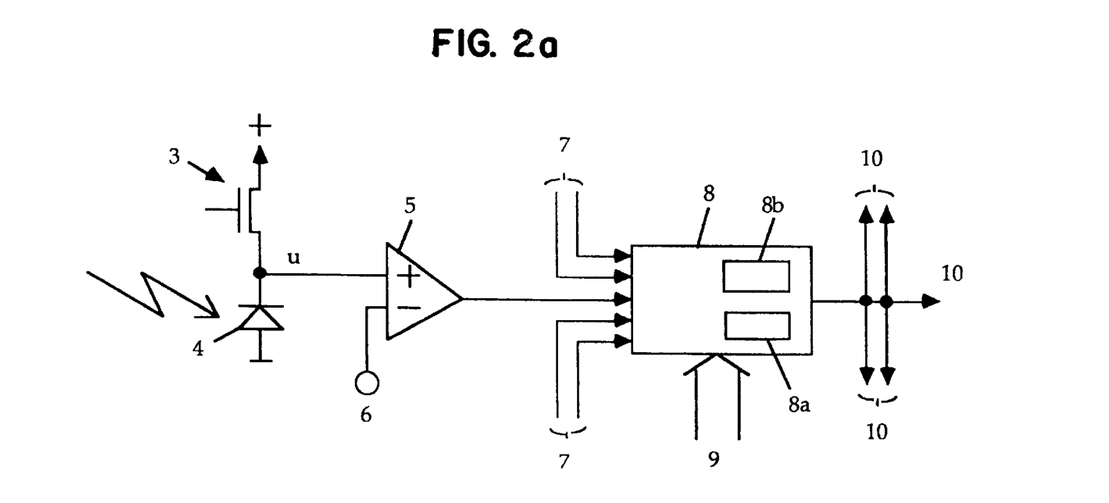
FIG. 2a is an example of an image point structure comprising a sensor element with a comparator and a sub-processor.

FIG. 2a illustrates in the form of a block diagram the mutual connection between the sensor elements, comparators and sub-processors. The designation 4 is used in respect of a sensor element of the light-integrating type, such as a photodiode, and the designation 3 in respect of a charging arrangement for charging the photo-diode 4 prior to a light reading. Connected to the photo-diode 4, the output voltage u of which represents its state of charge, is a comparator 5 in the form of a differential amplifier. The output from the comparator 5 is connected to an input to a sub-processor 8, in this case with four further inputs designated by 7 and five outputs designated by 10. The aforementioned inputs 7 are connected to the outputs on the sub-processors of adjacent photo-diodes, whereas the outputs from the sub-processor 8 are similarly connected to the inputs to the sub-processors of adjacent photo-diodes. The sub-processor 8 comprises an accumulator directory 8a and a propagation network 8b, a detailed description of which is given subsequently in conjunction with FIGS. 2b, 2c and 2d. The designation 6 is used in respect of an input for a reference value (12 in FIG. 3) for the comparator 5, and the designation 9 is used in respect of instructions arriving at the sub-processor 8.

Figure 3:
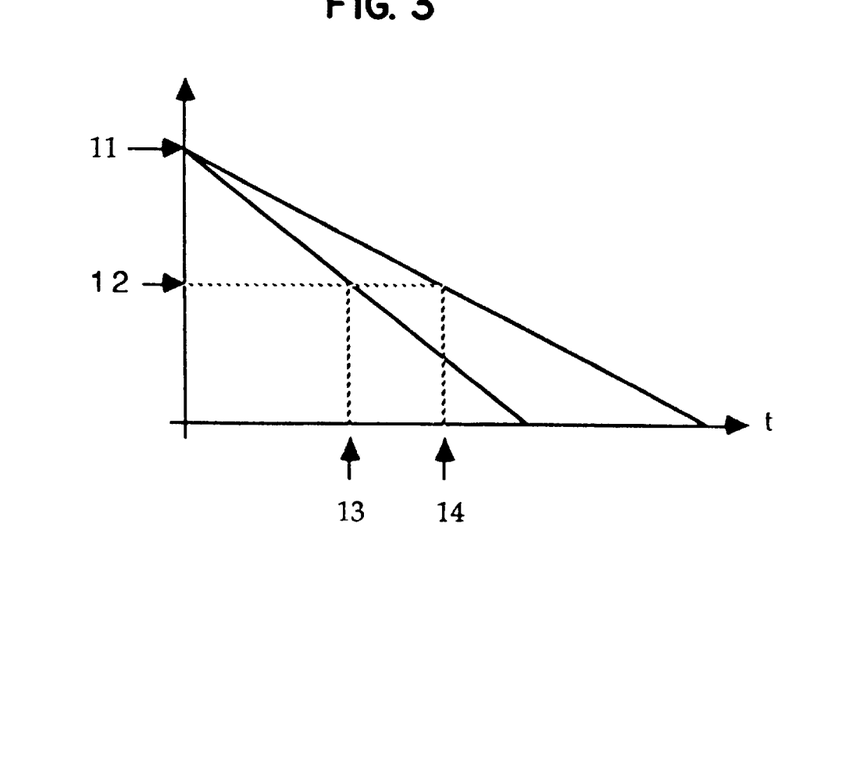
FIG. 3 illustrates the state of charge of the sensor element, i.e. its output signal as a function of time and a reference value.

The arrangement in accordance with the invention works as follows: with the help of the charging arrangement 3, the photo-diode 4 is charged to an initial value. When light, shown in FIG. 2a as a zig-zag arrow, falls on the photo-diode 4, its state of charge changes in time in proportion to the intensity of the incident light. The voltage u corresponding to the state of charge, the pattern of which an be appreciated from FIG. 3, is compared with the reference value 12. The output signal from the comparator 5 is binary and is supplied to one of the inputs 7 of the sub-processor 8. The binary output signal from the comparator 5 is logic 1 when u is greater than the reference value 12, and is otherwise logic 0. The sub-processor 8 is so arranged, with the help of output signals from photo-diodes belonging to the comparator, which in the matrix are next to the photo-diode 4, as to identify the occurrence of combinations of any photo-diodes for which the output signal of an associated comparator has exceeded or has not exceeded the aforementioned reference value. These combinations are selected having regard for the desired image processing and are described in more detail below in conjunction with FIGS. 4–7.

Figure 2B:
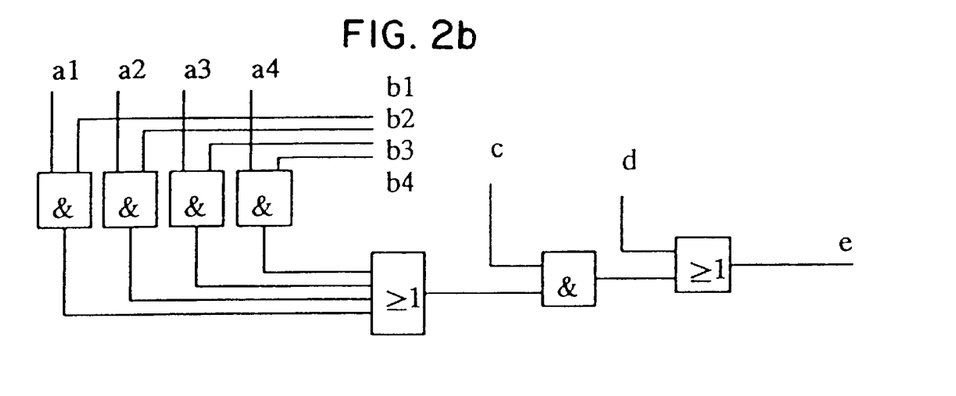
FIG. 2b illustrates schematically a controllable propagation network.

The job of the propagation network 8b in FIG. 2b is to propagate signals in an asynchronous fashion over the matrix. The inputs a1, a2 . . . a4 of the network are connected to the e-outputs from the propagation network of the closest neighbours. The inputs b1–b4 provide inputs for control information. The c-inputs are used to control distribution, which permits the distribution to be inhibited.

Figure 2C:
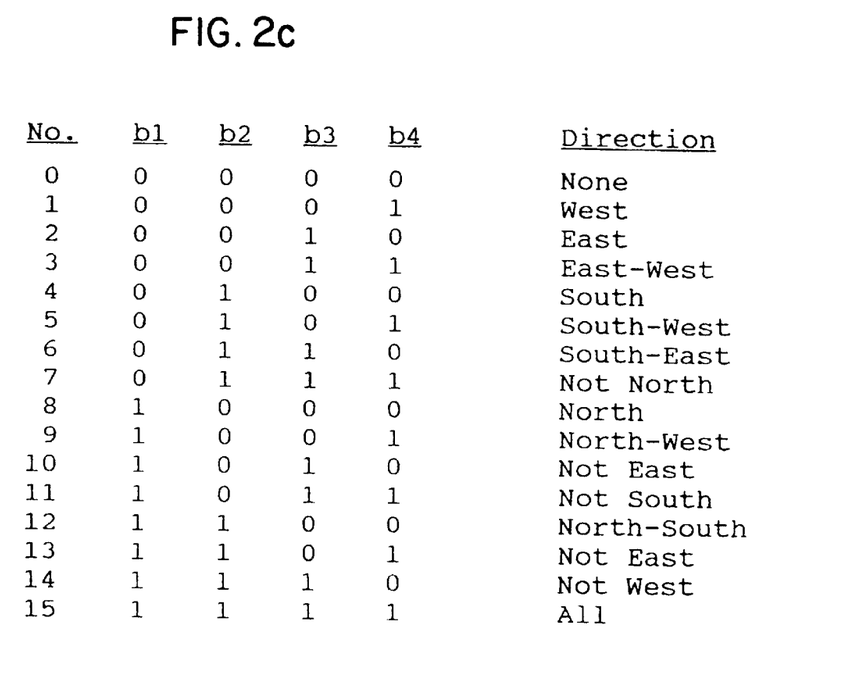
FIG. 2c illustrates examples of control information for obtaining different propagation cases.
Figure 2D:
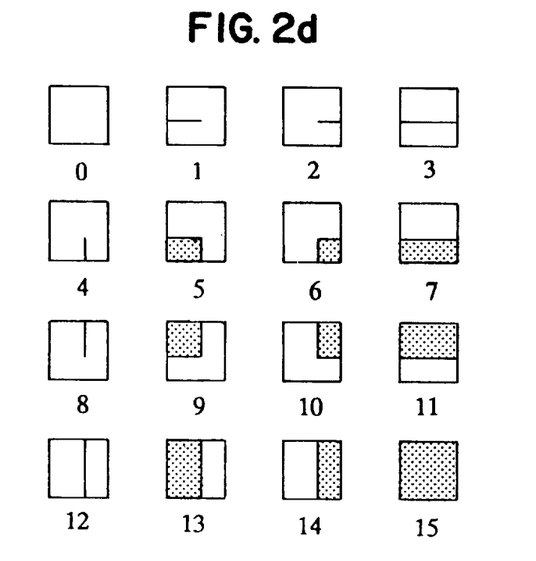
FIG. 2d illustrates a result image, in which only a single object point is present in the input image, corresponding to the various cases shown in FIG. 2c.

The input image, which consists of a single point in the example shown in FIG. 2d, is entered via the input d. The resulting image is obtained at the e-output. The direction of propagation is determined by an item of control data, which may be individual or identical for all the sub-processors. The item of control data is preferably stored in a directory in each sub-processor. The propagation network shown in FIG. 2b represents only one way of constructing such a network, and a person skilled in the art will appreciate that Boolean algebra can be used to vary the construction in may ways. The propagation network can be used, for example, to mark those objects in an image which, at least in part, coincide with objects in another image. The propagation means that a distribution in accordance with a particular pattern is obtained from each object point. The table in FIG. 2c shows the direction of propagation obtained using certain control information, and FIG. 2d illustrates the resulting image when only a single object point is present in the input image. No. 1, for example, with the control information b1=0, b2=0, b3=0 and b4=1, gives the distribution from the object points to the west. No. 5 shows a case in which the distribution runs in both a southerly and a westerly direction.

The points 13 and 14 in FIG. 3 represent points in time corresponding to the passage of the reference value 12 by two different discharge curves. The designation 11 is used in respect of the initial value produced by the charging arrangement 3 (in FIG. 1). As will be appreciated from the following, a large proportion of the present invention is based on this fact.

Figure 4:
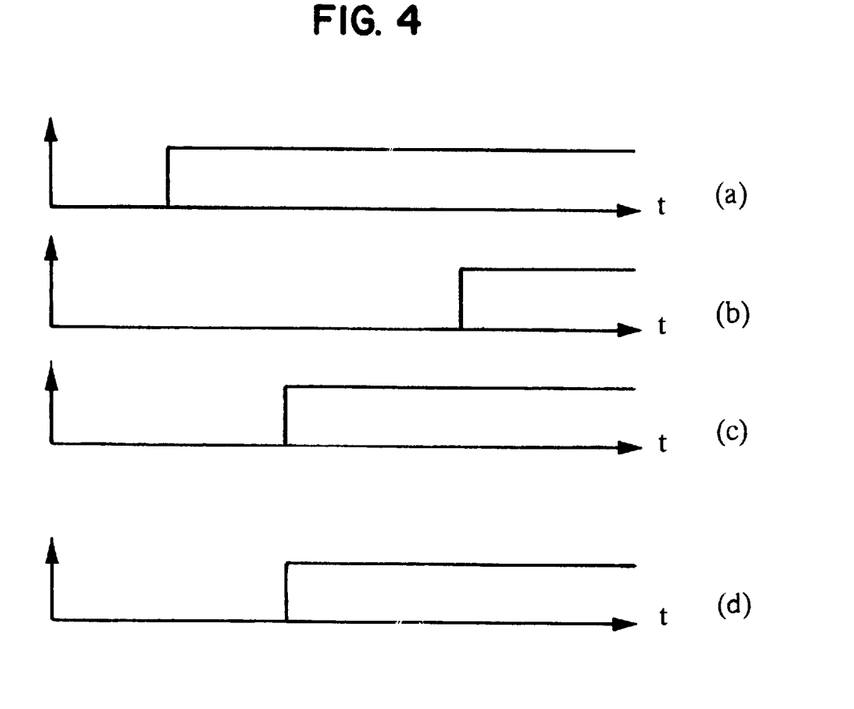
FIG. 4 illustrates the output signal from a group of three adjacent comparators and the resulting medians.

FIG. 4 illustrates how the invention is used in conjunction with median calculation. The output signal as a function of the time from the comparator belonging to three adjacent photo-diodes can be found in diagrams a, b and c. A person skilled in the art will appreciate that the expression median value is used to denote the middle grey scale value. This median value is obtained in accordance with the invention by using the sub-processor to sort into sequence the times at which the output signals from the photo-diodes pass the reference value. The median d thus corresponds here to the element corresponding to diagram c, whereas diagrams a and b correspond respectively to lighter or darker points.

Figure 5:
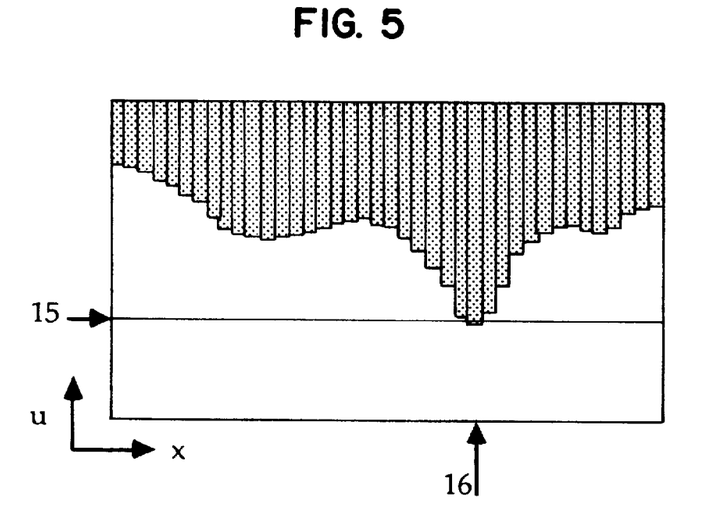
FIG. 5 illustrates the detection of the lightest point.

In FIG. 5, rastered columns represent the discharge sequence from a number of photo-diodes arranged in a row. The bases of the columns together provide an instantaneous picture of the state of charge of the photo-diodes and thus correspond to the light intensity along the row of diodes. Determination of the lightest point is achieved in accordance with the invention by entering a reference level 15 and identifying he photo-diode 16 of which the base of the column first reaches the reference value. The lightest point is conventionally determined by comparing all the values with one another in sequence, and a person skilled in the art will appreciate the simplification and the increase in speed that are achieved through the invention. A person skilled in the art will appreciate that the operation can also be performed in two dimensions.

Figures 6A, 6B:
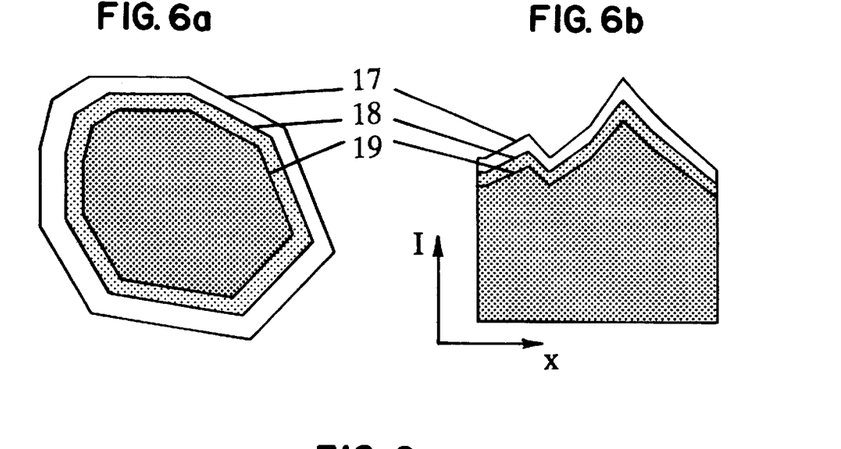
FIGS. 6a and 6b show the effect of two morphological operations, namely expansion (dilation) and contraction (erosion) in two dimensions and one dimension respectively on a grey scale image (FIG. 6b).
Figure 6C:
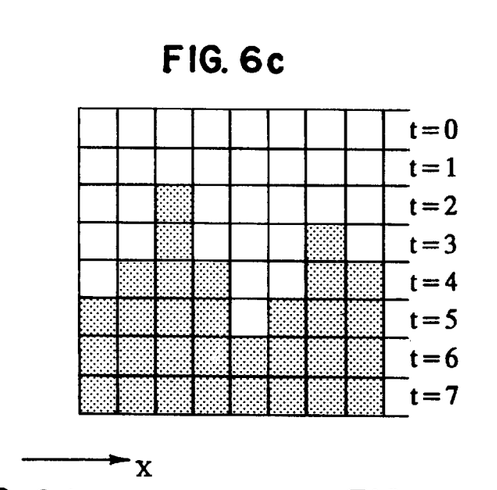
FIG. 6c shows a grey scale image obtained in accordance with the invention, which may be regarded as an extract from the one-dimensional case in accordance with FIG. 6b and as consisting of eight sensor elements.
Figure 6D:
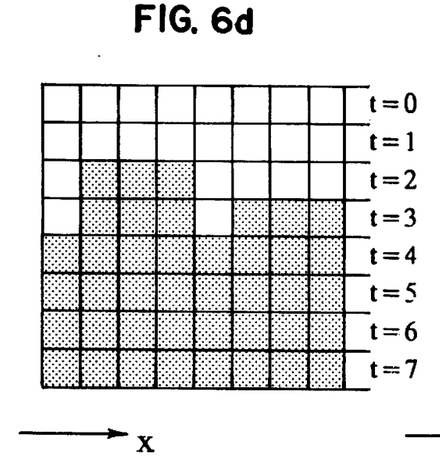
FIGS. 6d and 6e show the effect of morphological filtration, namely expansion (FIG. 6d) and contraction (FIG. 6e) on the result in accordance with FIG. 6c.
Figure 6E:
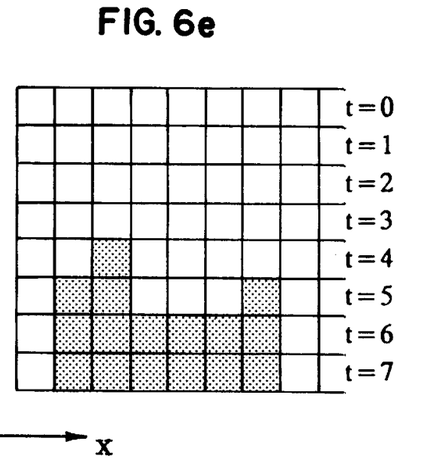

The contraction image processing operation involves peeling away the outermost layer of an object. Similarly, expansion involves applying an outer layer to an object. This is illustrated in FIG. 6a for a two-dimensional binary object 18. The designation 19 is applied to the contracted object, and the designation 17 to the expanded object. FIG. 6b shows corresponding operations in grey scale values (I), although only in a single dimension for reasons of clarity. The grey scale image in accordance with FIG. 6c represents the times at which the state of charge of eight photo-diodes reached the reference value. Expansion is obtained in accordance with the invention in that readings are taken successively for a group, for example consisting of three adjacent photo-diodes, of the times at which the state of charge of any photo-diode in the group reached the reference value, and in that the diode concerned acts as the central diode for the group of diodes, all of which are then regarded as having reached the reference value. The result of the expansion operation can be seen from FIG. 6d. A similar situation applies to contraction, where the requirement is for all the diodes in the group to have reached the reference value; the result of the contraction operation can be appreciated from FIG. 6e.

Figure 7:
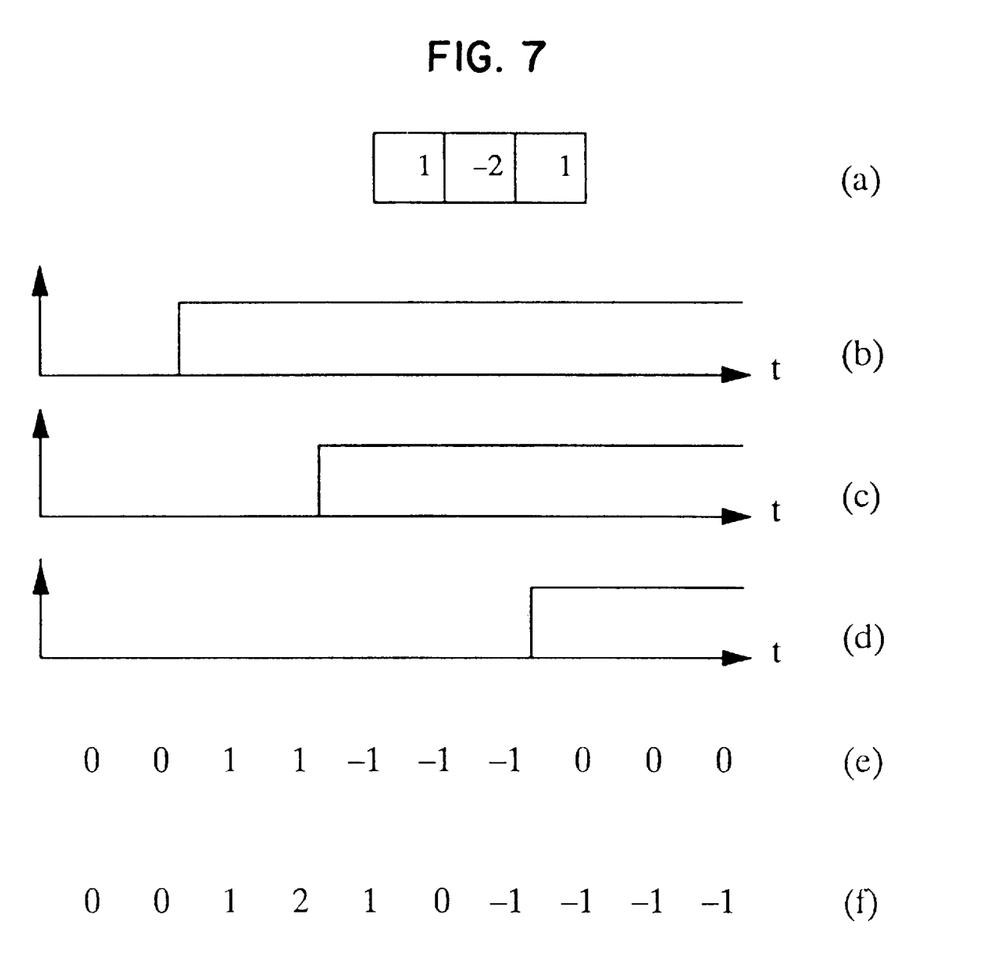
FIG. 7 illustrates linear filtration in accordance with the invention.

The linear filtration operation involves replacing the grey-scale value at a point by a weighted sum of the point and its surroundings. Illustrated in FIG. 7 is an example of a point and its neighbour to the right and to the left. Weightings of 1, −2 and 1 are used, as can be appreciated from FIG. 7(a). The output signals from the associated comparator are shown in diagrams (b), (c) and (d). The linear filtration operation is performed in accordance with the invention in that the associated filter coefficient is accumulated at a fixed or variable frequency for each photo-diode with a state of charge that has reached the reference value. FIG. 7(e) indicates the value to be added to the accumulator 8a, and FIG. 7(f) indicates the contents of the accumulator after addition. In the illustrative example the filtered value is thus −1 and was obtained after the state of charge of the photo-diode on the right reached the reference value.

It is obvious that the invention may be varied and modified in many ways within the scope of the idea of invention. Sensor elements and associated sub-processors can thus be arranged on different planes. The sub-processor can, of course, include circuits for calculating numbers, determining positions and calculating the centre of mass.

We claim:

1. Method of executing image processing operations such as object recognition or linear/nonlinear filtration on a two dimensional image, which is performed with light sensitive sensor elements executed in two-dimensional matrix form, comprising the steps of:

producing output signals from sensor elements, respective output signals corresponding to light intensity sensed by respective sensors;

producing monotonically varying reference signals for each sensor;

comparing each output signal from each sensor element with respective monotonically varying reference signals to produce difference signals; and continuously monitoring for each sensor element a difference between the output signal and its respective reference signal; and continuously monitoring difference signals for a combination of neighboring sensor elements.

2. Method in accordance with claim 1, comprising the further steps of varying the reference value, and determining a linearization relationship between the light intensity and a time at which the value of the output signal of the sensor element reached the reference value.

3. Method in accordance with claim 1, comprising the further step of sorting a group of sensor elements in the matrix in a series corresponding to a sequence in which the output signal values from the sensor elements pass the reference value.

4. Method in accordance with claim 1, comprising the further step of identifying a sensor element whose output signal value is first to pass the respective reference value, so as to detect the lightest point in the image.

5. Method in accordance with claim 1, comprising the further step of establishing which output signal values for a group of sensor elements have reached their respective reference values in a predetermined combination of sensor elements and which output signal values have not reached these respective reference values so as to perform a morphological operation.

6. Method in accordance with claim 1, comprising the further step of accumulating pulses for each sensor element, the number of pulses indicating a digital value for the light intensity when the output signal value reaches the reference value.

7. Method in accordance with claim 6, comprising the further step of generating the pulses with a variable frequency and determining a relationship between the light intensity value and its corresponding digital value.

8. Method in accordance with claim 1, comprising the further step of allocating a comparative output filter coefficient to each element in a group of sensor elements, and associated filter coefficients successively accumulating associated filter coefficients for each sensor element whose output signal value has reached the reference value, so as to perform a linear filtration.

9. Method in accordance with claim 8, wherein the accumulating step takes place at a variable frequency, so that a relationship is achieved between the light intensity value and the time at which the sensor element output valve reached the reference value.

10. Arrangement for the execution of the method in accordance with claim 1, comprising a number of sensor elements arranged on a substrate, each sensor element being allocated a comparator so as to compare the output signal value of each sensor element with a respective pre-adjustable reference value; and a sub-processor to identify the occurrence of combinations of sensor elements for which the output signal value has exceeded or has not exceeded the respective reference value.

11. Arrangement in accordance with claim 10, wherein the sub-processor includes an accumulator directory to count pulses where the number of pulses indicates light intensity, at the time when the output signal reaches the reference value and to successively accumulate coefficients associated with an image processing operation.

12. Arrangement in accordance with claim 10, further comprising a controllable propagation network (8b) is arranged on the substrate.

13. Method of executing image processing operations on a two dimensional image, performed with light integrating photo-sensitive sensor elements where each sensor element produces an output signal corresponding to a respective state of charge, executed in two-dimensional matrix form, comprising the steps of:

comparing the state of charge of each sensor element with a pre-adjustable reference value to produce a difference signal;

continuously monitoring the difference signal for each sensor element to determine whether the output signal is greater than the pre-adjustable reference value; and continuously monitoring the difference signals of a combination of neighboring sensor elements to determine whether the output signals are greater than their respective pre-adjustable reference values.

14. Method in accordance with claim 13, comprising the further steps of varying the reference value, and determining a linearization relationship between the light intensity and a time at which the value of the output signal of the sensor element reaches the reference value.

15. Method in accordance with claim 13, comprising the further step of sorting a group of sensor elements in the matrix in a series corresponding to a sequence in which the output signal values from the sensor elements pass the reference value.

16. Method in accordance with claim 13, comprising the further step of identifying a sensor element whose output signal value is first to pass the respective reference value, so as to detect the lightest point in the image.

17. Method in accordance with claim 13, comprising the further step of establishing which output signal values for a group of sensor elements have reached their respective reference values in a predetermined combination of sensor elements and which output signal values have not reached these respective reference values so as to perform a morphological operation.

18. Method in accordance with claim 13, comprising the further step of accumulating pulses for each sensor element, the number of pulses indicating a digital value for the light intensity when the output signal value reaches the reference value.

19. Method in accordance with claim 13, comprising the further step of generating the pulses with a variable frequency and determining a relationship between the light intensity value and its corresponding digital value.

20. Method in accordance with claim 13, comprising the further step of allocating a comparative output filter coefficient to each element in a group of sensor elements, and associated filter coefficients successively accumulating associated filter coefficients for each sensor element whose output signal value has reached the reference value, so as to perform a linear filtration.

21. Method in accordance with claim 13, the accumulating step takes place at a variable frequency, so that a relationship is achieved between the light intensity value and the time at which the sensor element output valve reached the reference value.

22. Arrangement for the execution of the method in accordance with claim 13, comprising a number of sensor elements arranged on a substrate, each sensor element being allocated a comparator so as to compare the output signal value of each sensor element with a respective pre-adjustable reference value; and a subprocessor to identify the occurrence of combinations of sensor elements for which the output signal value has exceeded or has not exceeded the respective reference value.

23. Arrangement in accordance with claim 13, wherein the sub-processor includes an accumulator directory to count pulses where the number of pulses indicates light intensity, at the time when the output signal reaches the reference value and to successively accumulate coefficients associated with an image processing operation.

24. Arrangement in accordance with claim 13, further comprising a controllable propagation network (8b) is arranged on the substrate.

* * * * *

UNITED STATES PATENT AND TRADEMARK OFFICE
CERTIFICATE OF CORRECTION

PATENT NO. : 5,822,468

DATED : OCTOBER 13, 1998

INVENTOR(S) : FORCHHEIMER ET AL.

It is certified that error appears in the above-identified patent and that said Letters Patent is hereby corrected as shown below:

Col. 3, line 12: insert —:— after the word "which"

Col. 4, line 10: "an" should read —can—

Col. 4, line 41: "may" should read —many—

Signed and Sealed this

Twenty-seventh Day of June, 2000

Attest:

Q. TODD DICKINSON

Attesting Officer

Director of Patents and Trademarks